US008689160B2

(12) United States Patent
Lin et al.

(10) Patent No.: US 8,689,160 B2
(45) Date of Patent: *Apr. 1, 2014

(54) METHOD AND APPARATUS OF AN INTEGRATED CIRCUIT (71) Applicant: Industrial Technology Research Institute, Hsinchu (TW)

(72) Inventors: Chang Tzu Lin, Hsinchu County (TW); Ding Ming Kwai, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/919,605

(22) Filed: Jun. 17, 2013

(65) Prior Publication Data

US 2013/0283224 A1  Oct. 24, 2013

Related U.S. Application Data (62) Division of application No. 13/328,403, filed on Dec. 16, 2011, now Pat. No. 8,522,186.

(51) Int. Cl.
*G06F 17/50* (2006.01)

(52) U.S. Cl.
CPC ........ *G06F 17/5081* (2013.01); *G06F 17/5077* (2013.01); *G06F 17/5072* (2013.01)
USPC ........... 716/113; 716/122; 716/129; 716/130; 716/134; 716/138; 703/16

(58) Field of Classification Search
CPC ............ G06F 17/5081; G06F 17/5077; G06F 17/5072

USPC ......... 716/113, 122, 129, 130, 134, 136, 138; 703/16

See application file for complete search history.

(56) References Cited

U.S. PATENT DOCUMENTS 5,726,492 A * 3/1998 Suzuki et al. ................ 257/685
6,175,157 B1   1/2001 Morifuji
6,711,721 B2   3/2004 Brennan (Continued)

FOREIGN PATENT DOCUMENTS

JP      09115910     5/1997
JP      2002303652   10/2002

OTHER PUBLICATIONS

X. Zhang et al."Redundant vias insertion for performance enhancement in 3D ICs," IEICE Trans. Electron., vol. E91-C, No. 4, pp. 571-580, Apr. 2008.

(Continued)

*Primary Examiner* — Phallaka Kik
(74) *Attorney, Agent, or Firm* — WPAT, P.C.; Anthony King; Kay Yang (57) ABSTRACT

A computer-implemented method for interconnect redundancy of a circuit design comprises the steps of setting Manhattan distance being less than or equal to three pitches; placing a plurality of dummy micro bumps on at least one side of a die including a signal bump formed on the at least one side; determining an interconnecting candidate by selecting from the dummy micro bumps, which is distant from the signal bump by the Manhattan distance; and providing a routing path between the at least one interconnecting candidate and the signal bump.

11 Claims, 14 Drawing Sheets

(56) References Cited

U.S. PATENT DOCUMENTS

| | | | |
|---|---|---|---|
| 6,724,084 B1 | 4/2004 | Hikita et al. | |
| 7,299,426 B2 | 11/2007 | Bonges, III | |
| 7,302,662 B2 | 11/2007 | Lee et al. | |
| 7,386,826 B1* | 6/2008 | Keller et al. | 716/117 |
| 7,665,052 B1 | 2/2010 | Serdar et al. | |
| 7,673,268 B2 | 3/2010 | Kashyap et al. | |
| 7,868,283 B2 | 1/2011 | Mabuchi | |
| 7,886,248 B2 | 2/2011 | Hirota | |
| 7,984,394 B2 | 7/2011 | Anderson et al. | |
| 7,996,808 B2* | 8/2011 | Arp et al. | 716/126 |
| 8,006,212 B2* | 8/2011 | Sinha et al. | 716/122 |
| 8,046,727 B2* | 10/2011 | Solomon | 716/116 |
| 8,136,071 B2* | 3/2012 | Solomon | 716/119 |
| 8,156,456 B1* | 4/2012 | Rahman et al. | 716/104 |
| 8,522,186 B2* | 8/2013 | Lin et al. | 716/129 |
| 2006/0038300 A1 | 2/2006 | Tanida et al. | |
| 2006/0064653 A1 | 3/2006 | Zhang et al. | |
| 2007/0256042 A1* | 11/2007 | Kashyap et al. | 716/6 |
| 2008/0042046 A1 | 2/2008 | Mabuchi | |
| 2009/0064080 A1* | 3/2009 | Alpert et al. | 716/13 |
| 2010/0064263 A1* | 3/2010 | Rahim et al. | 716/2 |
| 2010/0257495 A1 | 10/2010 | Wu | |
| 2011/0055785 A1 | 3/2011 | Chakanakar et al. | |
| 2011/0055791 A1* | 3/2011 | Gao | 716/131 |
| 2012/0139092 A1 | 6/2012 | Su et al. | |
| 2012/0153433 A1 | 6/2012 | Yen et al. | |
| 2012/0185809 A1* | 7/2012 | Kadiyala et al. | 716/104 |
| 2012/0261662 A1* | 10/2012 | Liang et al. | 257/48 |
| 2013/0185691 A1* | 7/2013 | Drumm et al. | 716/132 |

OTHER PUBLICATIONS

K.-Y. Lee, S.-T. Lin, and T.-C. Wang, "Enhanced double via insertion using wire bending," IEEE Trans. Computer-Aided Design of Integrated Circuits and Systems, vol. 29, No. 2, pp. 171-184, Feb. 2010.

K.-Y. Lee, T.-C. Wang, C.-K. Koh, and K.-Y. Chao, "Optimal double via insertion with on-track preference," IEEE Trans. Computer-Aided Design of Integrated Circuits and Systems, vol. 29, No. 2, pp. 318-323, Feb. 2010.

K.-Y. Lee, C.-K. Koh, T.-C. Wang, and K.-Y. Chao, "Optimal post-routing redundant via insertion," in Proc. Int. Symp. Physical Design, Apr. 2008, pp. 111-117.

K.-Y. Lee, C.-K. Koh, T.-C. Wang, and K.-Y. Chao, "Fast and optimal redundant via insertion," IEEE Trans. Computer-Aided Design of Integrated Circuits and Systems, vol. 27, No. 12, pp. 2197-2208, Dec. 2008.

K.-Y. Kee and T.-C. Wang, "Post-routing redundant via insertion for yield/reliability improvement," in Proc. Asian South Packfic Design Automation Conf., 2006, pp. 303-308.

D.-M. Kwai, C.-T. Lin "3D Stacked IC Layout Considering Bond Pad Density and Doubling for Manufacturing Yield Improvement," in 12th Internatinal Symposium on Quality Electronic Design (ISQED), pp. 129-134, Mar. 2011.

* cited by examiner

METHOD AND APPARATUS OF AN INTEGRATED CIRCUIT

CROSS-REFERENCE TO RELATED APPLICATIONS

This application is a Divisional of the U.S. patent application Ser. No. 13/328,403, now U.S. Pat. No. 8,522,186, filed on Dec. 16, 2011, all of which is hereby incorporated by reference in its entirety.

Although incorporated by reference in its entirety, no arguments or disclaimers made in the parent application apply to this divisional application. Any disclaimer that may have occurred during the prosecution of the above-referenced application(s) is hereby expressly rescinded. Consequently, the Patent Office is asked to review the new set of claims in view of the entire prior art of record and any search that the Office deems appropriate.

BACKGROUND

1. Technical Field

The current disclosure relates to an apparatus and a method of interconnect redundancy and timing analysis of an integrated circuit.

2. Background

Three dimensional integrated circuit is different from the conventional two dimensional integrated circuit which is a chip having two or more tiers of active electronic components being integrated both vertically and horizontally into a single circuit. Therefore, the three dimensional integrated circuit is able to conquer the difficulty of conforming different transistors having different functions onto a single integrated circuit. In current routing types of the three dimensional integrated circuit, Through-Silicon Via (TSV) is inserted into the chip and implementing routing to change the signal connecting position in the redistribution layer on the upper side and lower side of the chip, and stacking chips by bonding micro bumps. Therefore, signal communication between different chips in a three dimensional integrated circuit is able to be transmitted vertically and horizontally by the TSV, redistribution layer and micro bumps.

SUMMARY

The current disclosure discloses a computer-implemented method for interconnect redundancy of a circuit design.

In accordance with one embodiment of the current disclosure, a computer-implemented method for interconnect redundancy of a circuit design comprises the steps of setting Manhattan distance less than or equal to a predetermined value; placing a plurality of dummy micro bumps on at least one side of a die including a signal bump formed on the at least one side; determining an interconnecting candidate by selecting from the dummy micro bumps which are distant from the signal bump by the Manhattan distance; and providing a routing path between the at least one interconnecting candidate and the signal bump.

In accordance with one embodiment of the current disclosure, a computer-implemented method for timing analysis of integrated circuit design, comprising the steps of generating a physical layout of the integrated circuit; performing interconnect redundancy on the physical layout of the integrated circuit to create a plurality of redundant interconnections, wherein the interconnect redundancy is based on a physical layout of an integrated circuit being bonded; performing a first static timing analysis to computing an first expected timing of the integrated circuit; performing a first redundant interconnections removing to remove redundant interconnections of the plurality of redundant interconnections which have timing violation according to the first expected timing; and outputting a chip layout.

In accordance with one embodiment of the current disclosure, an apparatus for timing analysis of integrated circuit design comprises a redundant interconnection device, a static timing analyzer, and a redundant interconnection removing device. The redundant interconnection device is configured to provide a plurality of routing paths. Each routing path connects a signal bump on a die to one of a plurality of dummy micro bumps on the die, and the one of the plurality of dummy micro bumps is distant from the signal bump within a predetermined Manhattan distance. The static timing analyzer is configured to provide timing information on a circuit on the die. The redundant interconnection removing device is configured to remove a routing path that violates the timing information.

The foregoing has outlined rather broadly the features and technical advantages of the current disclosure in order that the detailed description of the disclosure that follows may be better understood. Additional features and advantages of the disclosure will be described hereinafter, which form the subject of the claims of the disclosure. It should be appreciated by those skilled in the art that the conception and specific embodiment disclosed may be readily utilized as a basis for modifying or designing other structures or processes for carrying out the same purposes of the current disclosure. It should also be realized by those skilled in the art that such equivalent constructions do not depart from the spirit and scope of the disclosure as set forth in the appended claims.

BRIEF DESCRIPTION OF THE DRAWINGS

The objectives and advantages of the current disclosure are illustrated with the following description and upon reference to the accompanying drawings in which.

DETAILED DESCRIPTION

The current disclosure discloses a computer-implemented method for interconnect redundancy of a circuit design.

Figure 1:
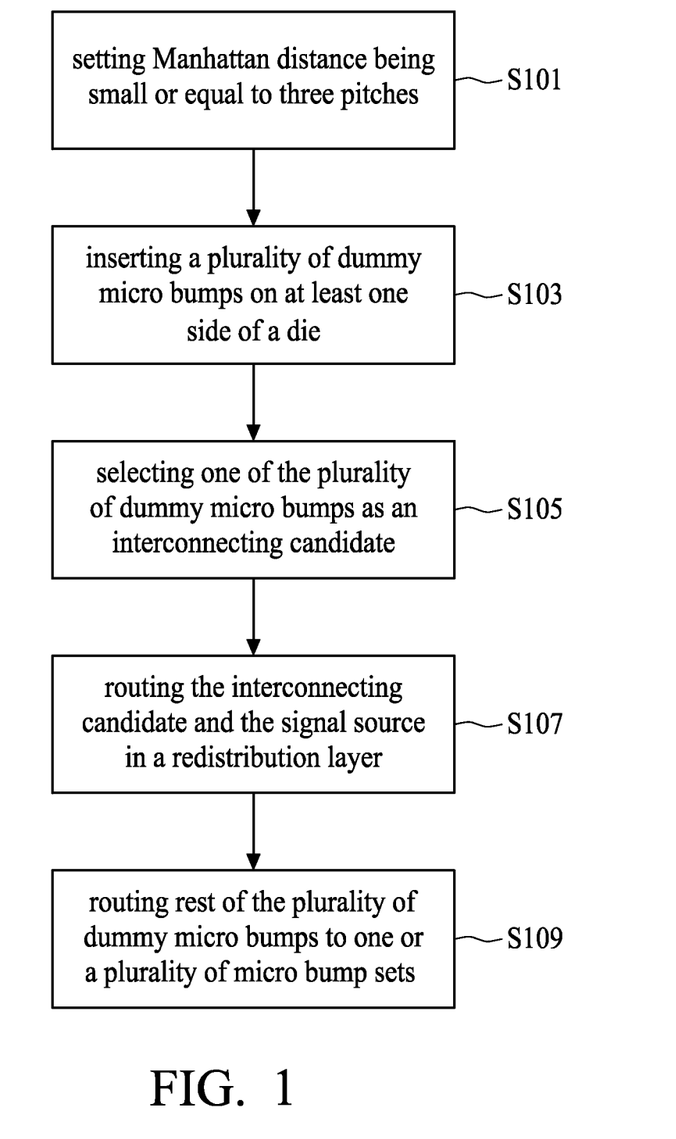
FIG. 1 illustrates a flow chart of one embodiment of the current disclosure indicating a computer-implemented method for interconnect redundancy of a circuit design.

FIG. 1 illustrates a flow chart of one embodiment of the current disclosure indicating a computer-implemented method for interconnect redundancy of a circuit design. The method includes the following steps. Step S101, setting a predetermined Manhattan distance, for example, the predetermined Manhattan distance being less than or equal to three pitches. Step S103, inserting a plurality of dummy micro bumps on at least one side of a die. Step S105, selecting one of the plurality of dummy micro bumps as an interconnecting candidate. Step S107, routing from the interconnecting candidate to a signal bump in a redistribution layer of the die, and in the step S109, routing rest of the plurality of dummy micro bumps to one or a plurality of micro bump sets.

Moreover, a distance between the interconnecting candidate and one of a plurality of signal bumps on the at least one side of the die is satisfied the Manhattan distance. The rest of the plurality of dummy micro bumps have a distance to the signal bump being not satisfied the Manhattan distance and the one or each of the plurality of bump sets having at least two micro bumps. In some embodiment, the rest of dummy micro bumps that are not connected with any signal bumps are connected to form at least one bump set. In some embodiment, the rest of dummy micro bumps that are not connected with any signal bumps are connected to form a plurality of separated bump sets. In some embodiments, the bump set may comprise two connected dummy micro bumps. In some embodiments, the bump set may comprise a plurality of connected dummy micro bumps.

Figure 2:
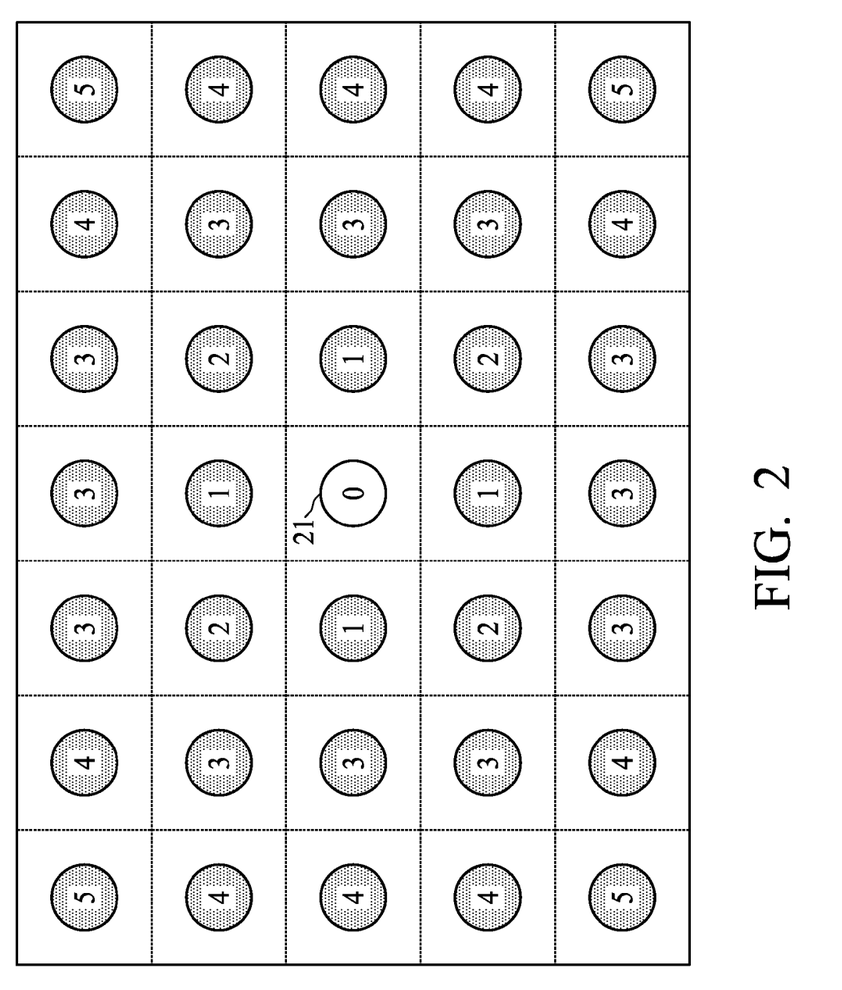
FIG. 2 schematically illustrates one embodiment of the current disclosure indicating a micro bump matrix.

FIG. 2 schematically illustrates one embodiment of the current disclosure indicating a micro bump matrix. As shown in FIG. 2, each of the plurality of micro bumps on the micro bump matrix is indicated by a number, which represents the Manhattan distance between the micro bump and a signal bump 21. The signal bump 21 includes a via or a signal micro bump. The via includes a Through-Silicon Via (TSV).

Figure 3:
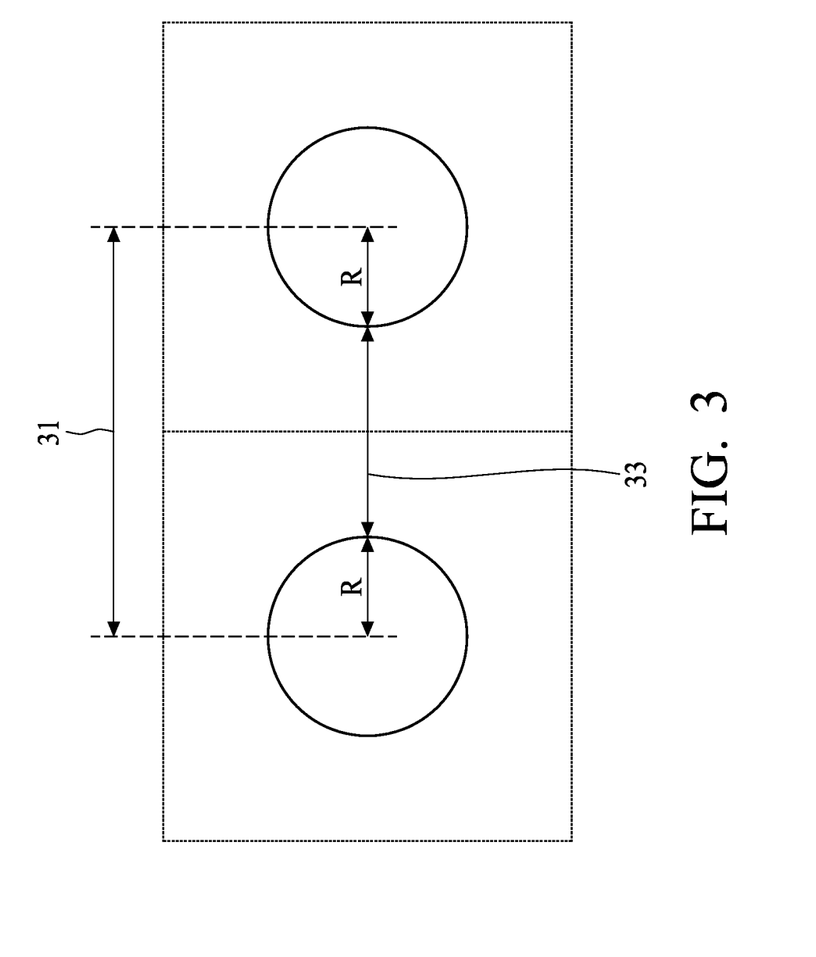
FIG. 3 schematically illustrates one pitch of one embodiment of the current disclosure.

FIG. 3 schematically illustrates one pitch of one embodiment of the current disclosure. As shown in FIG. 3, the one pitch 31 can be defined as the sum of a distance between two bumps' edge 33 and a diameter of a bump.

Figure 4:
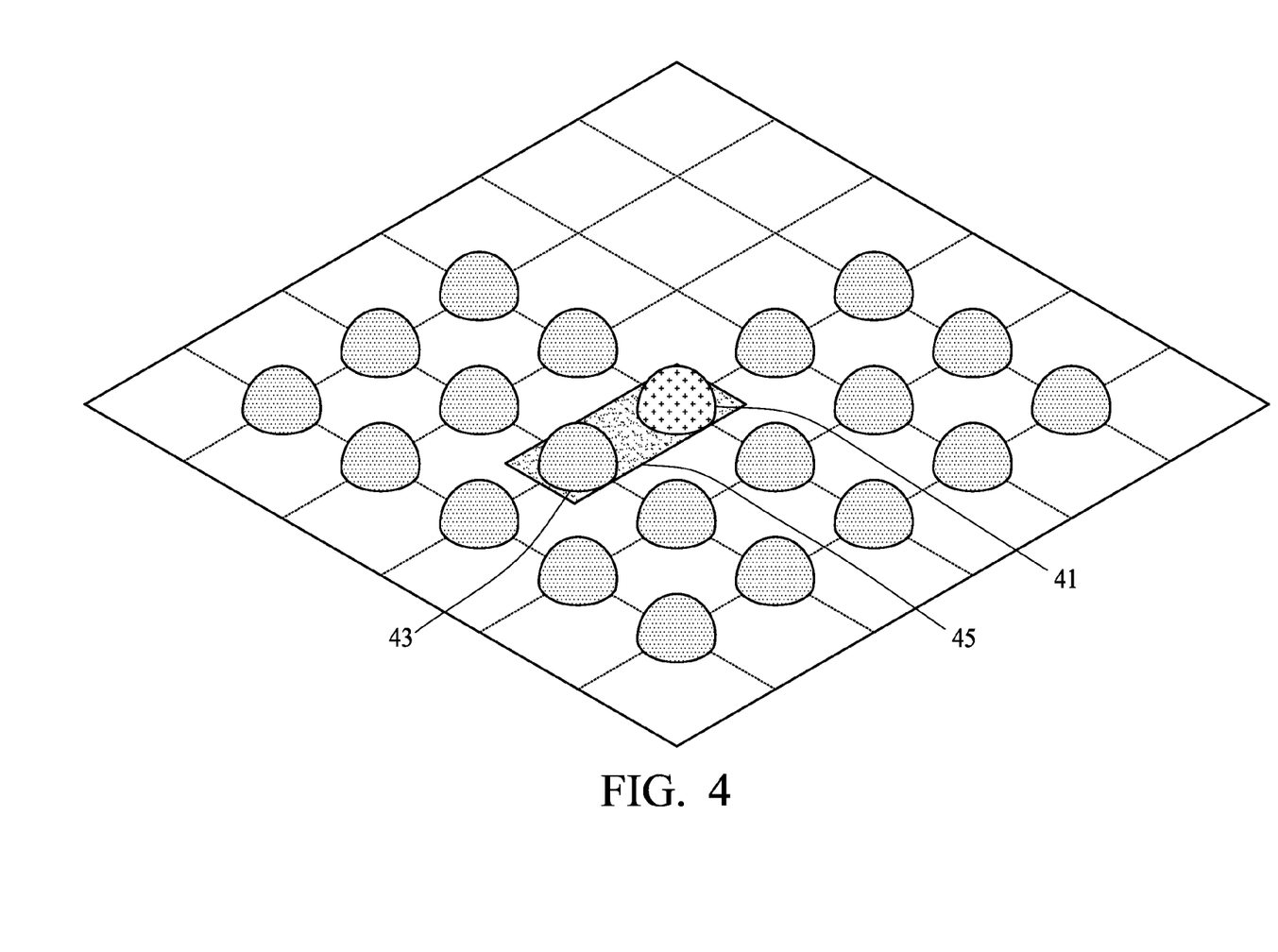
FIG. 4 schematically illustrates a routing path of one embodiment of the current disclosure.

FIG. 4 schematically illustrates a routing path of one embodiment of the current disclosure. As shown in FIG. 4, the routing path 45 goes directly from the signal bump 41 to the interconnection candidate 43. The interconnection candidate 43 is one pitch away from the signal bump 41.

Figure 5:
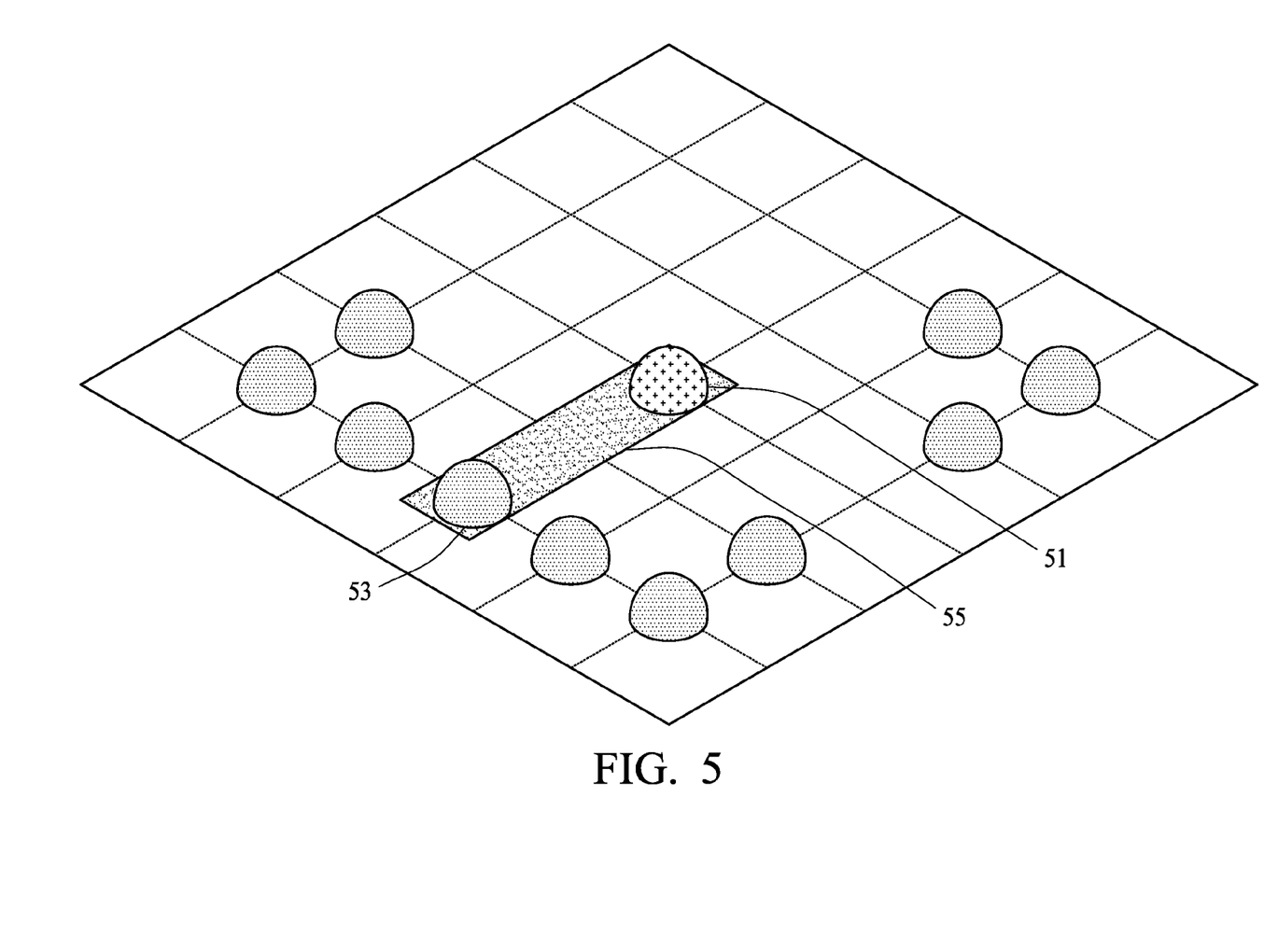
FIG. 5 schematically illustrates a routing path of one embodiment of the current disclosure.

FIG. 5 schematically illustrates a routing path of one embodiment of the current disclosure. As shown in FIG. 5, the routing path 55 between the signal bump 51 and the interconnection candidate 53 comprises no bend. The interconnection candidate 53 is two pitches away from the signal bump 51.

Figure 6:
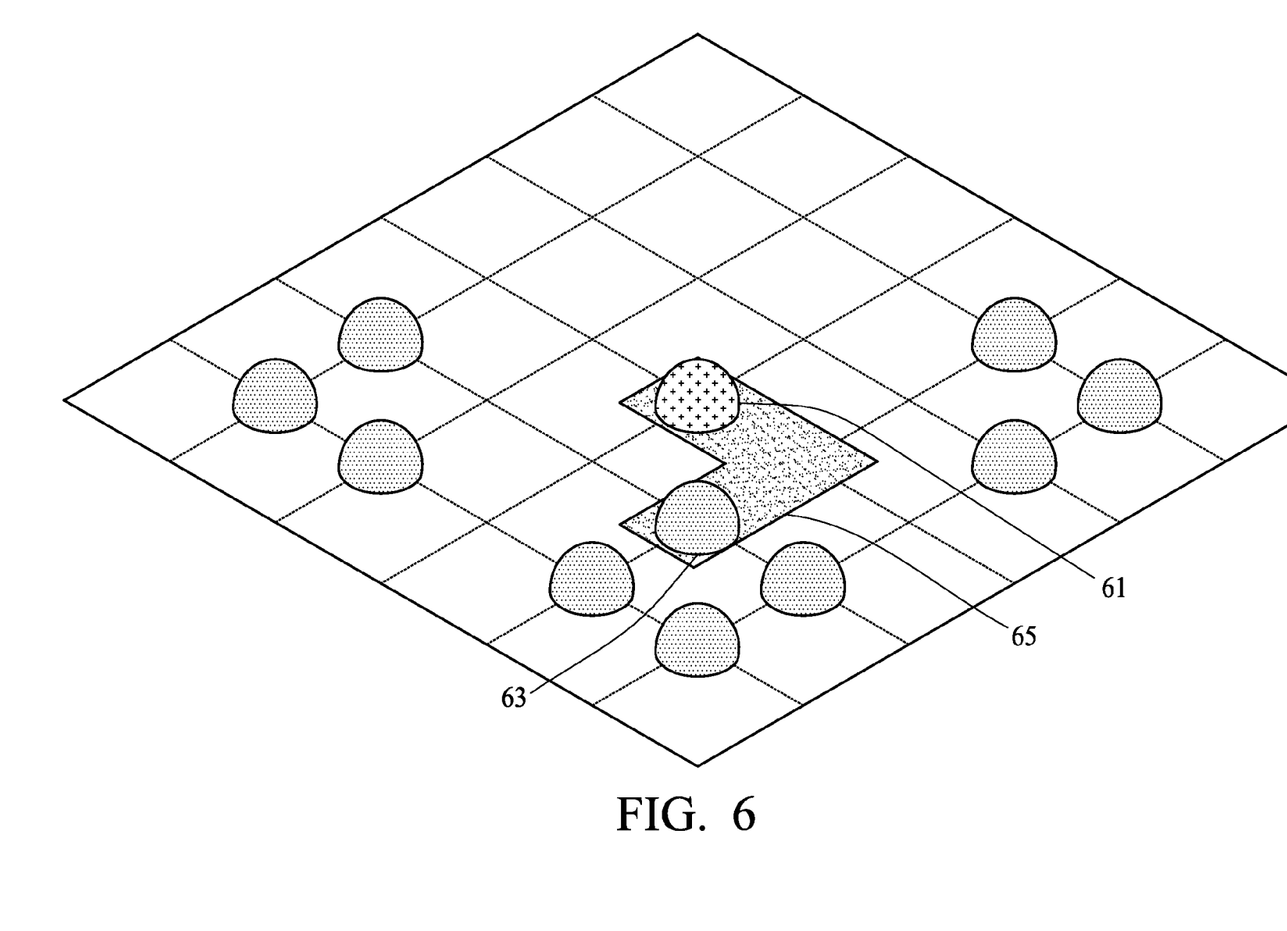
FIG. 6 schematically illustrates a routing path of one embodiment of the current disclosure.

FIG. 6 schematically illustrates a routing path of one embodiment of the current disclosure. As shown in FIG. 6, the routing path 65 between the signal bump 61 and the interconnection candidate 63 comprises a single bend. The interconnection candidate 63 is two pitches away from the signal bump 61.

Figure 7:
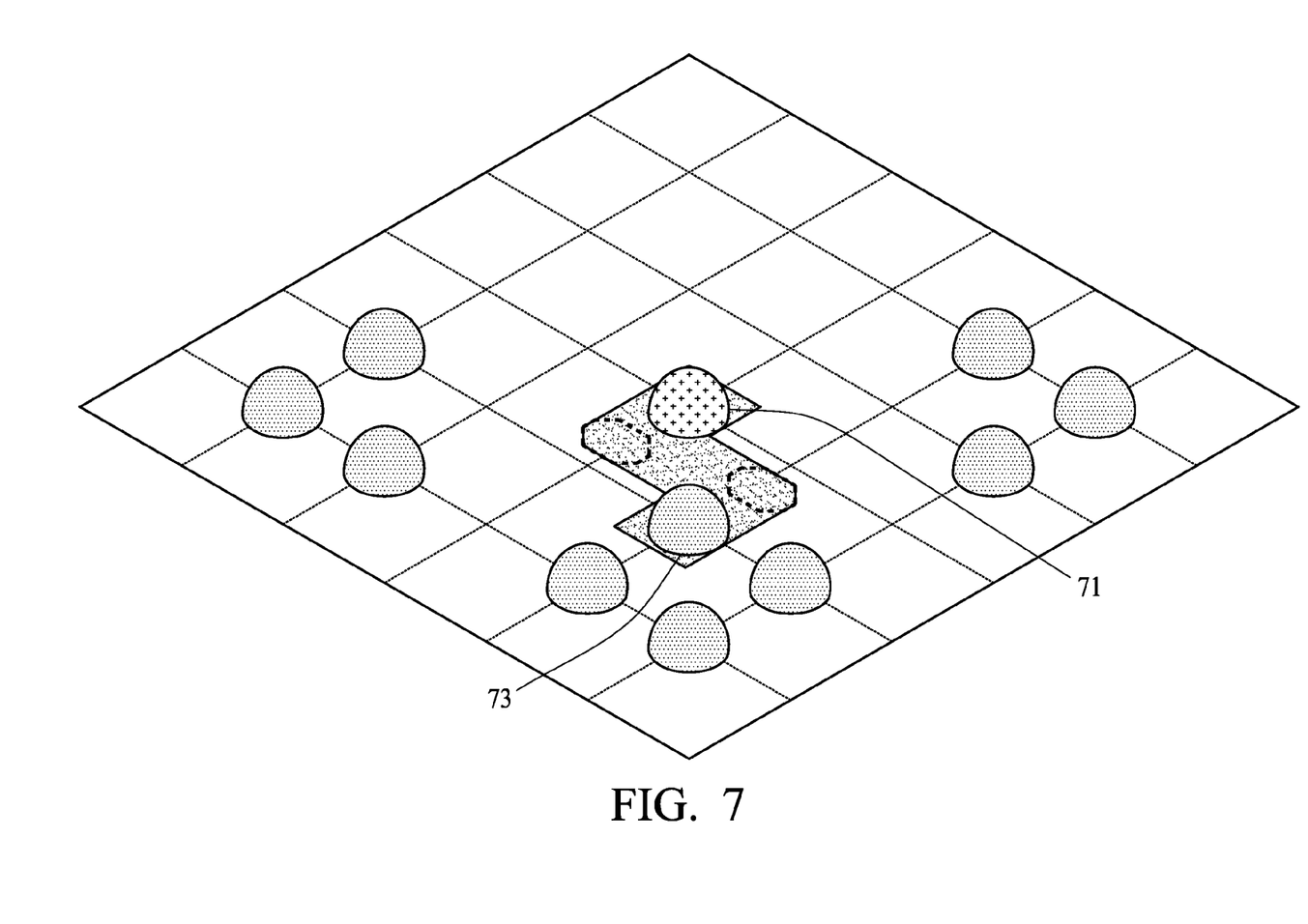
FIG. 7 schematically illustrates a routing path of one embodiment of the current disclosure.

FIG. 7 schematically illustrates a routing path of one embodiment of the current disclosure. As shown in FIG. 7, the routing path between the signal bump 71 and the interconnection candidate 73 comprises a double bend. The interconnection candidate 73 is two pitches away from the signal bump 71.

Figure 8:
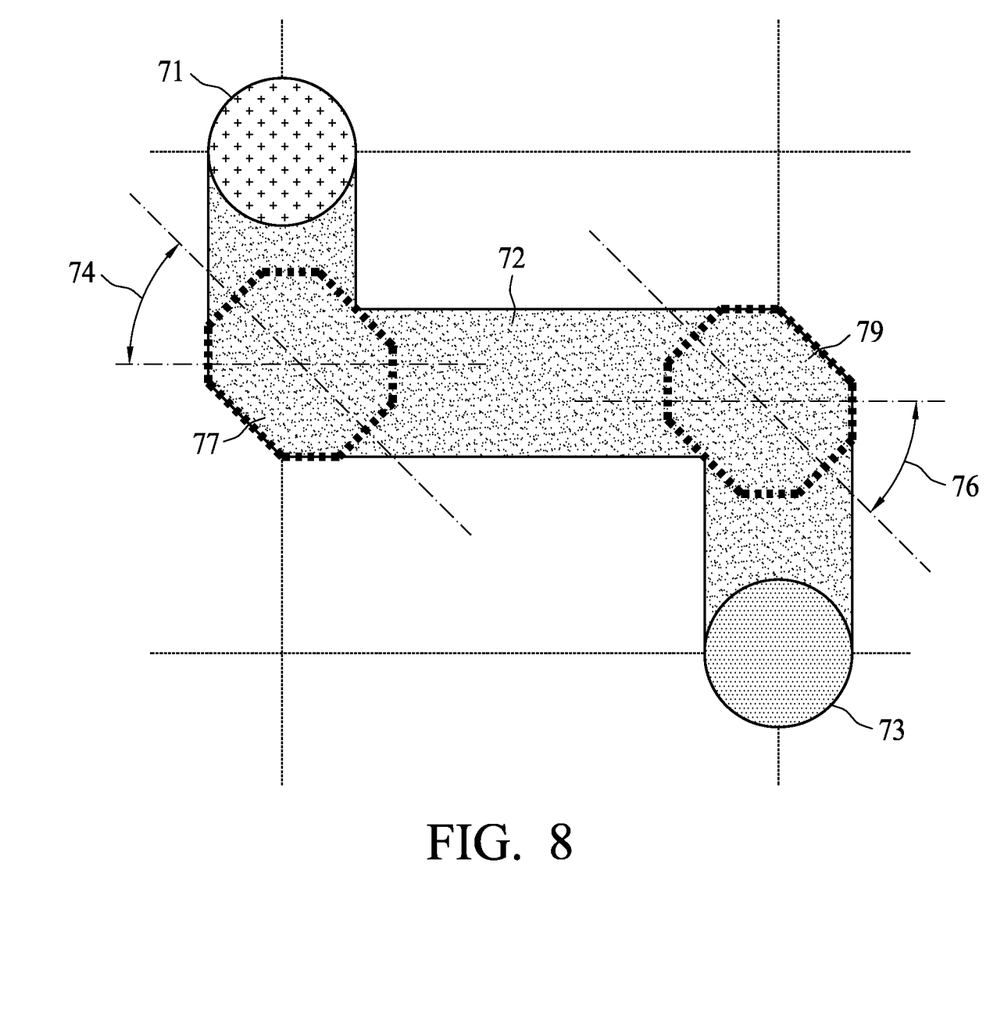
FIG. 8 schematically illustrates an enlarged view of the routing path of one embodiment of the current disclosure in FIG. 7.

FIG. 8 schematically illustrates an enlarged view of the routing path of one embodiment of the current disclosure in FIG. 7. As shown in FIG. 8, the routing path comprises a first bending portion 77, a horizontal portion 72 and a second bending portion 79. The first bending portion 77 couples to the signal bump 71. The horizontal portion 72 couples to the first bending portion 77 and the second bending portion 79. The second bending portion 79 couples to the interconnection candidate 73.

The first bending portion 77 is disposed alone a first diagonal line which has a first angle 74 with a horizontal line. The first angle 74 is 45 degrees. The second bending portion 79 is disposed alone a second diagonal line which has a second angle 76 with a horizontal line. The second angle 76 is 45 degrees.

Figure 9:
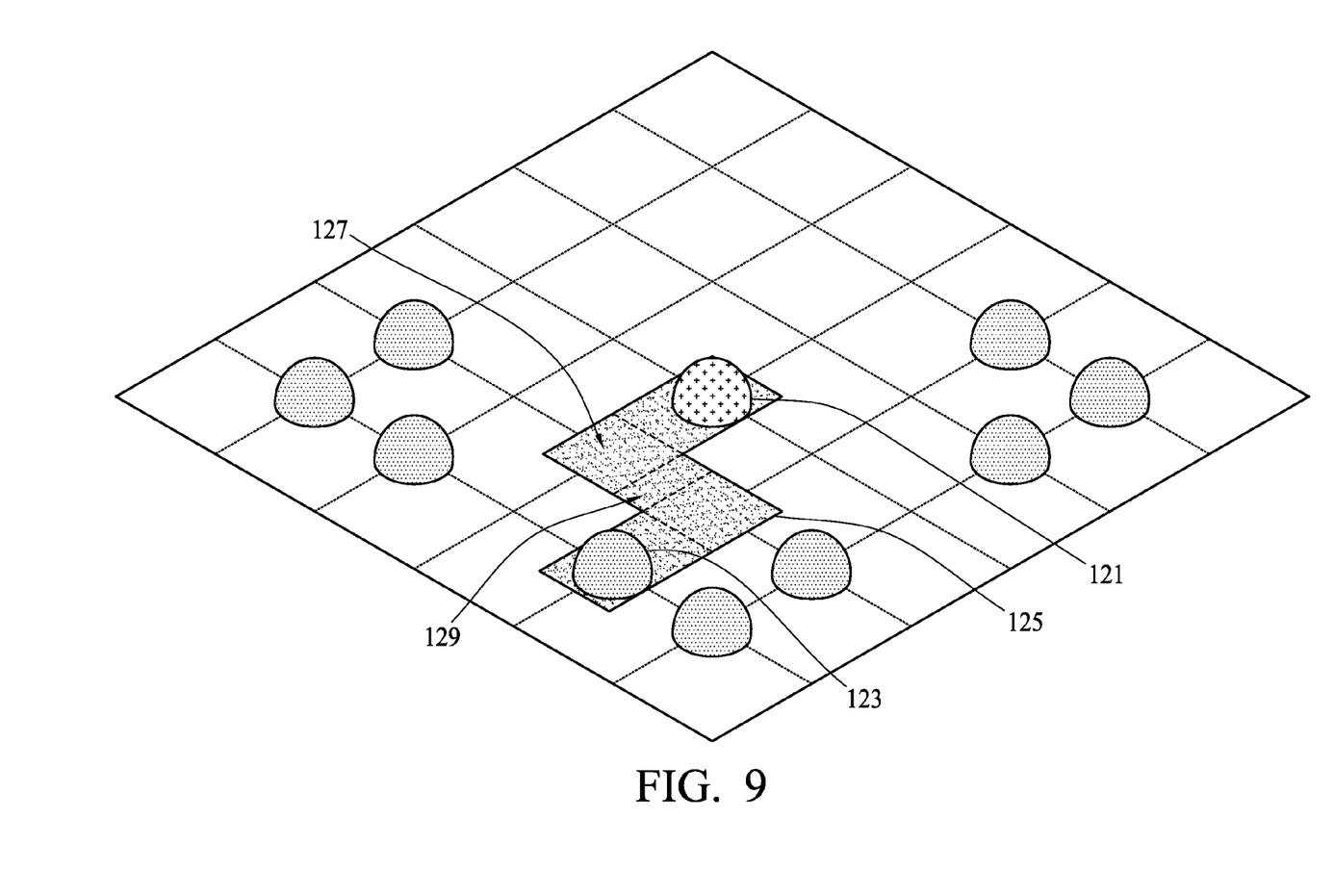
FIG. 9 schematically illustrates a routing path of one embodiment of the current disclosure.

FIG. 9 schematically illustrates a routing path of one embodiment of the current disclosure. As shown in FIG. 9, the routing path between the signal bump 121 and the interconnection candidate 123 comprises a double bend. The interconnection candidate 123 is two pitches away from the signal bump 121. The routing path comprises a first bending portion 127, a horizontal portion 129 and a second fourth bending portion 125. The first bending portion 127 couples to the signal bump 121. The horizontal portion 129 couples to the first bending portion 127 and the second bending portion 125. The second bending portion 125 couples to the interconnection candidate 123.

The first bending portion 127 is disposed alone a first vertical line which has a 90 degree angle with a horizontal line. The second bending portion 125 is disposed alone a second vertical line which has a 90 degree angle with a horizontal line.

Figure 10:
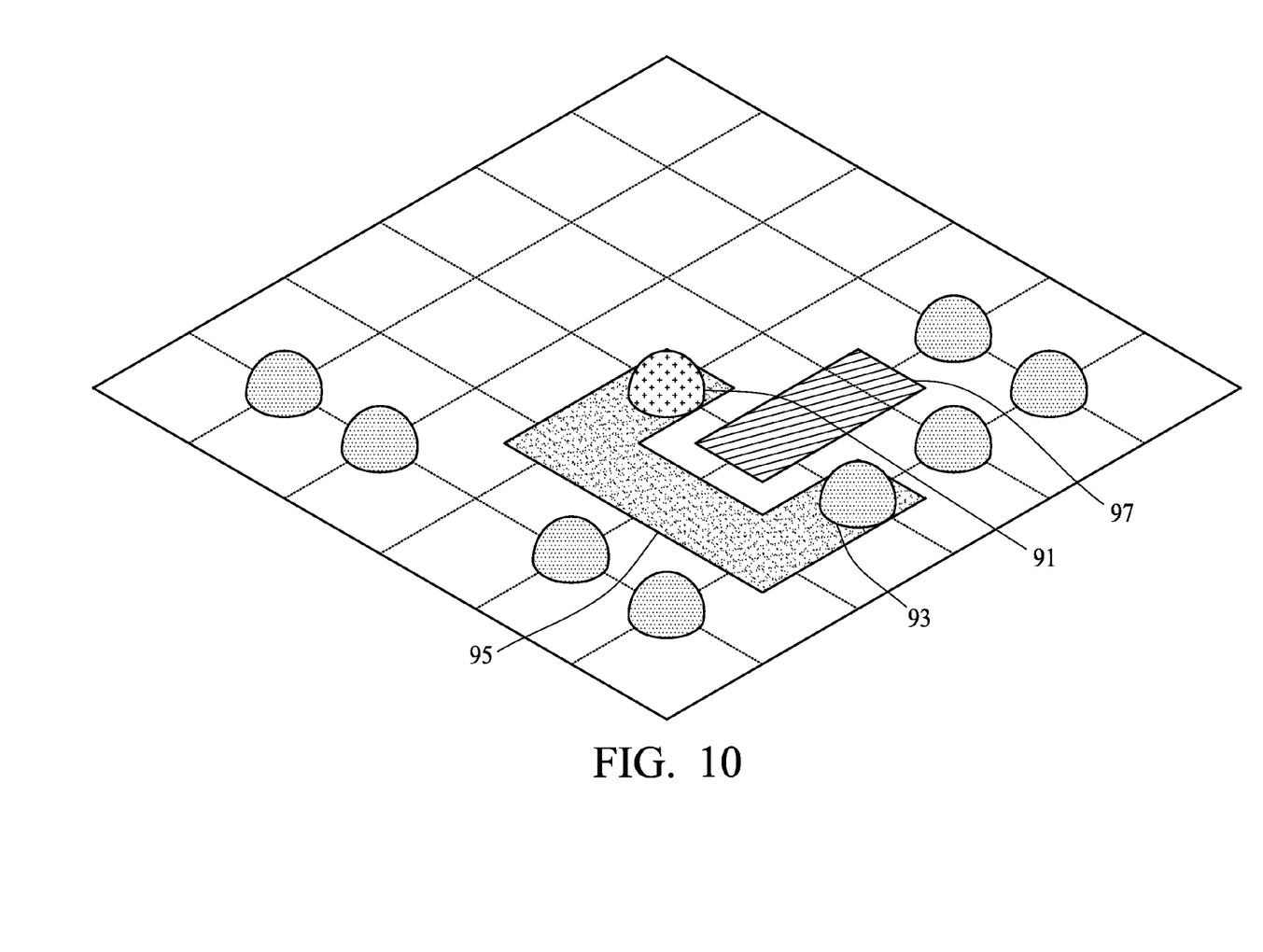
FIG. 10 schematically illustrates a routing path of one embodiment of the current disclosure.

FIG. 10 schematically illustrates a routing path of one embodiment of the current disclosure. As shown in FIG. 10, the routing path 95 between the signal bump 91 and the interconnection candidate 93 takes a detour to avoid going through a bather 97.

Figure 11:
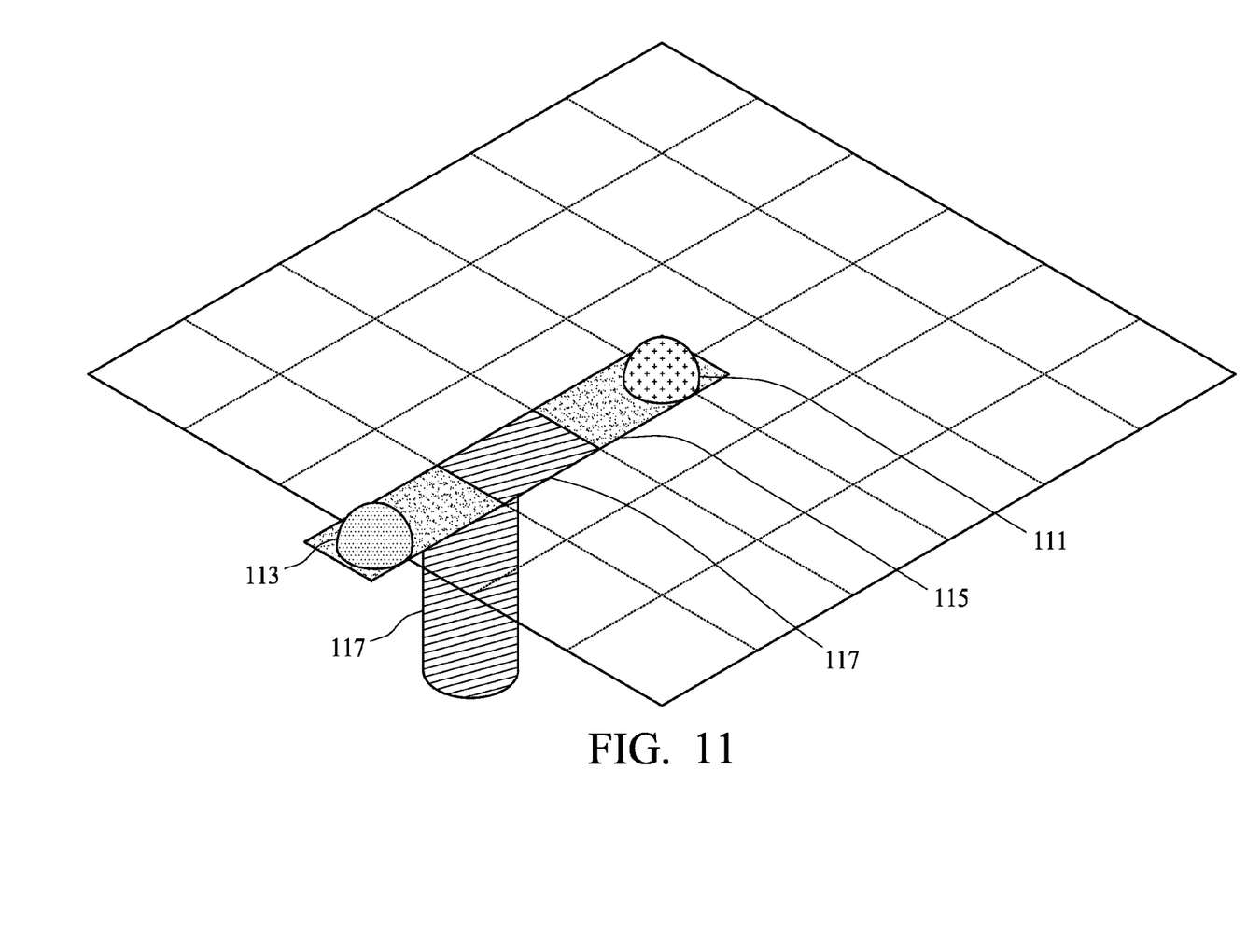
FIG. 11 schematically illustrates a routing path of one embodiment of the current disclosure.

FIG. 11 schematically illustrates a routing path of one embodiment of the current disclosure. As shown in FIG. 11, the routing path 115 between the interconnecting candidate 113 and the signal bump 111 comprises no bend and passes through a TSV 117, wherein the interconnection candidate 113 is three pitches away from the signal bump 111.

Figure 12:
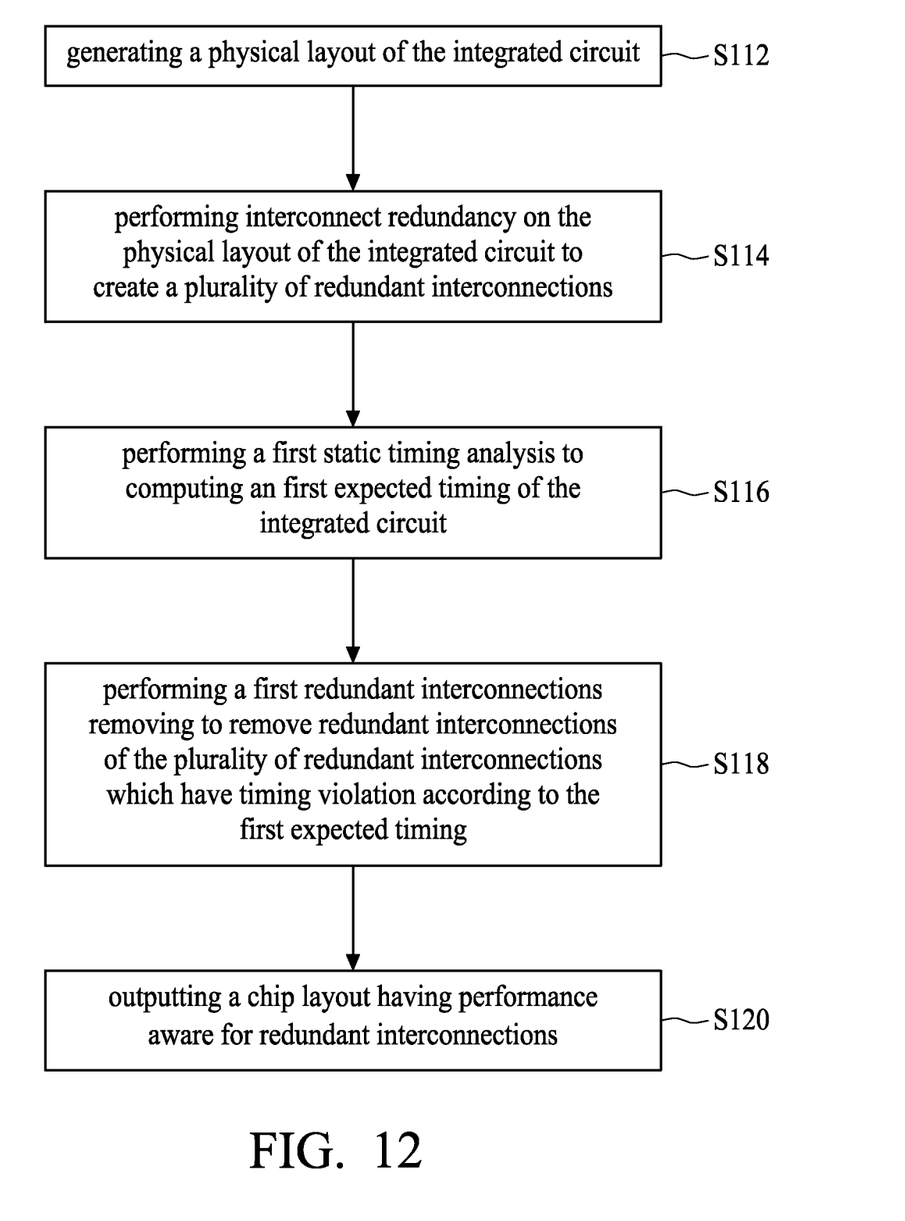
FIG. 12 illustrates a flow chart of one embodiment of the current disclosure indicating a computer-implemented method for timing analysis of integrated circuit design.

FIG. 12 illustrates a flow chart of one embodiment of the current disclosure indicating a computer-implemented method for timing analysis of integrated circuit design. The method includes the following steps. Step S112, generating a physical layout of the integrated circuit. Step S114, performing interconnect redundancy on the physical layout of the integrated circuit to create a plurality of redundant interconnections, wherein the interconnect redundancy is based on a physical layout of an integrated circuit to be bonded. Step S116, performing a first static timing analysis to computing a first expected timing of the integrated circuit. Step S118, performing a first redundant interconnections removing to remove redundant interconnections of the plurality of redundant interconnections which have timing violation according to the first expected timing, and Step S120, outputting a chip layout. Step S120 further comprises stacking a plurality of chip layouts.

The plurality of chip layouts includes a plurality of second chip layout having redundant interconnections on an upper side and a lower side stacked on a third chip having redundant interconnections on one side. Moreover, a first chip layout having redundant interconnection on a lower side is stacked on the plurality of second chip layouts. The plurality of second chip layouts is sandwiched between the first chip layout and the third chip layout. Moreover, the method for timing analysis of integrated circuit design further includes performing a second static timing analysis to compute a second expected timing of the integrated circuit after stacking the plurality of chip layouts.

Then, the method for timing analysis of integrated circuit design further includes performing a second removing redundant interconnection to remove redundant interconnections which have timing violation according to the second expected timing, and outputting a three dimension chip layout.

Figure 13:
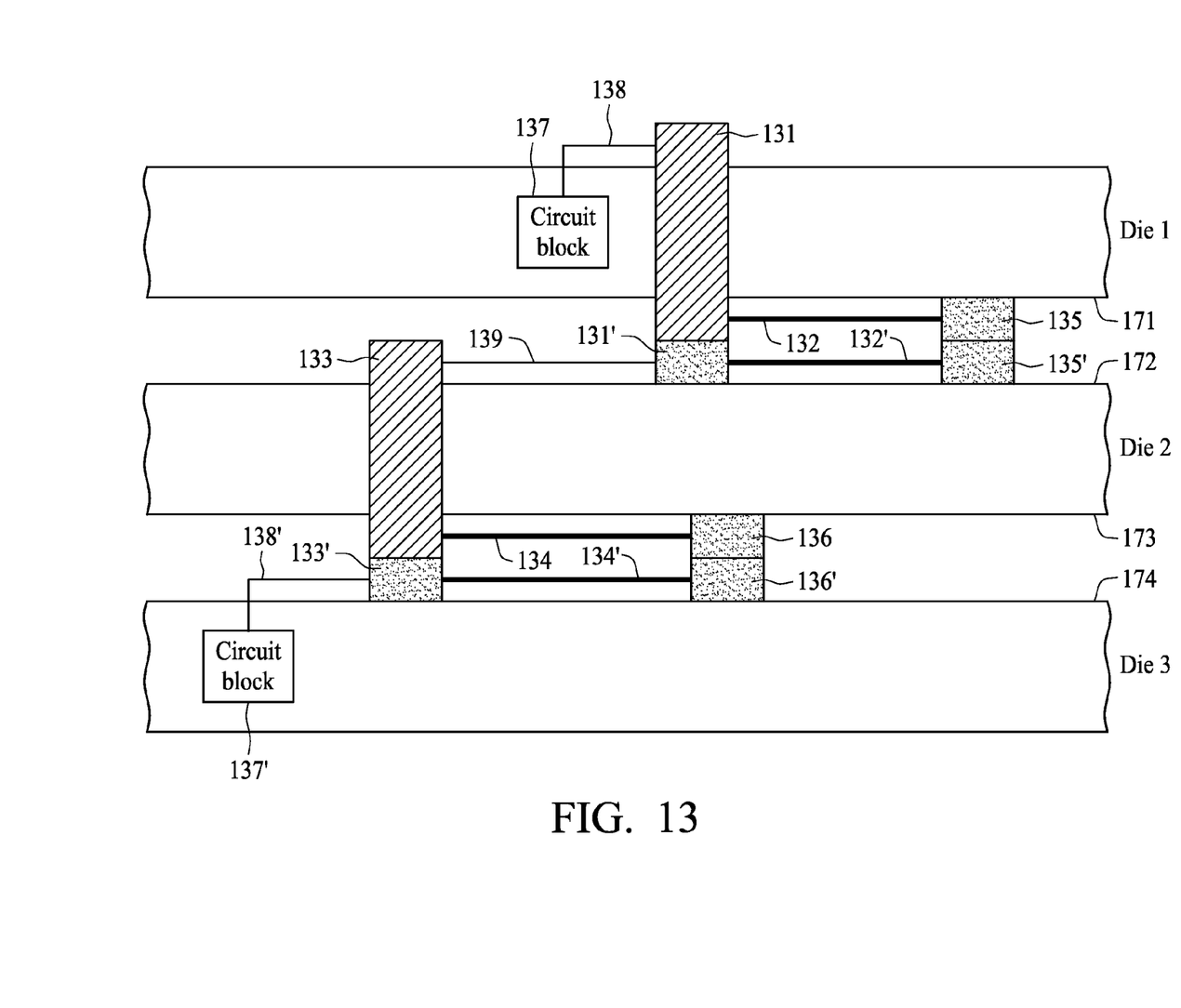
FIG. 13 schematically illustrates a sectional drawing of the one embodiment of the current disclosure.

FIG. 13 schematically illustrates a sectional drawing of one embodiment of the current disclosure indicating a three dimensional integrated circuit. As shown in FIG. 13, a die 1 and a die 2 are stacked on a die 3. The die 1 has redundant interconnections on a lower side 171 which is corresponding to redundant interconnections on an upper side 172 of the die 2. The die 2 has redundant interconnections on a lower side 173 which is corresponding to redundant interconnections on an upper side 174 of the die 3.

Therefore, a circuit block 137 is able to electrically communicate with circuit block 137' via a first electrical signal communicating path including a metal path 138, a TSV 131, a micro bump 131', a metal path 139, a TSV 133, a micro bump 133', and a metal path 138'. Moreover, the circuit block 137 is able to electrically communicate with circuit block 137' via a second electrical signal communicating path including the metal path 138, the TSV 131, a redundant interconnection 132, a micro bump 135, a micro bump 135', a redundant interconnection 132', the micro bump 131', the metal path 139, the TSV 133, a redundant interconnection 134, a micro bump 136, a micro bump 136', a redundant interconnection 134', the micro bump 133' and the metal path 138'.

Figure 14:
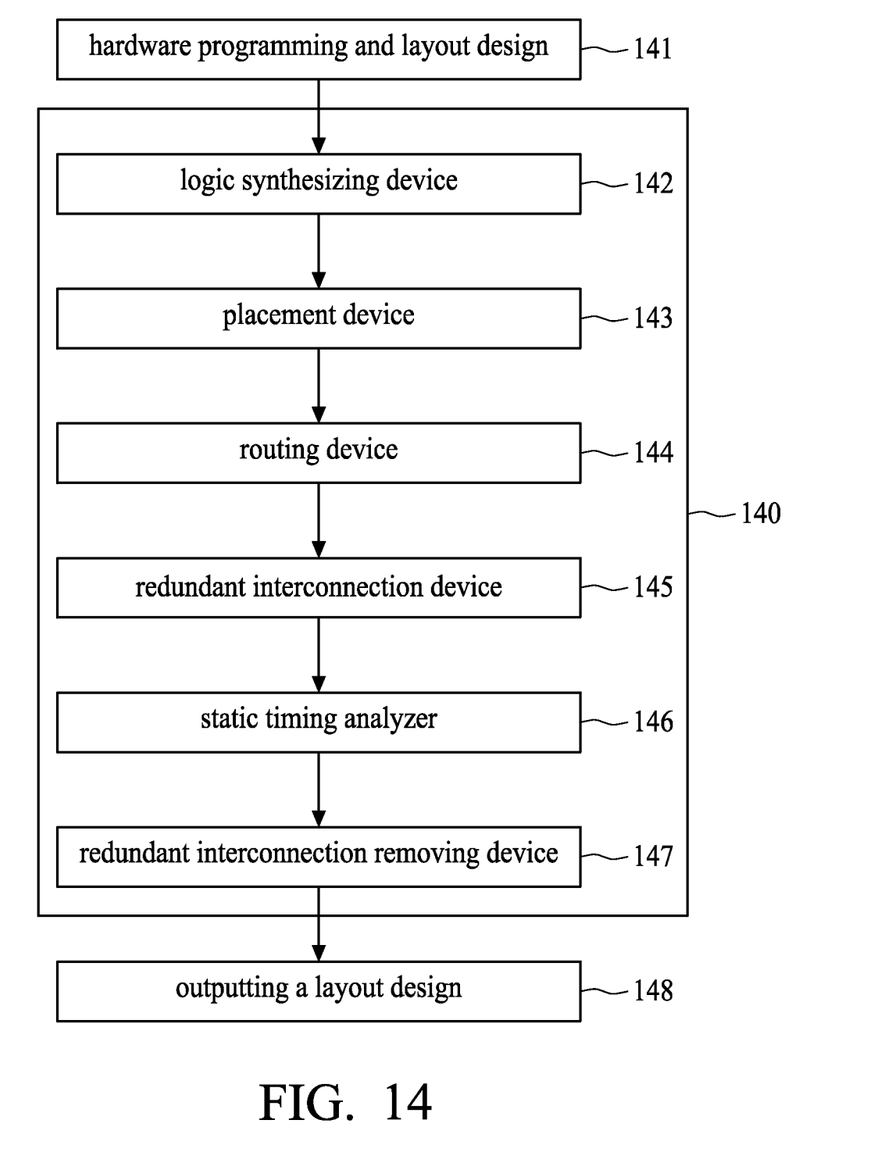
FIG. 14 is a block diagram of a system for timing analysis in accordance with an embodiment.

FIG. 14 is a block diagram of an apparatus 140 for timing analysis in accordance with an embodiment. Referring to FIG. 14, the apparatus 140 may comprise a logic synthesizing device 142, a placement device 143, a routing device 144, a redundant interconnection device 145, a static timing analyzer 146 and a redundant interconnection removing device 147.

The logic synthesizing device 143 may be configured to, in response to a user input, convert a hardware programming and layout design file or a hardware description file from the user into a design implementation in terms of circuit components such as logic gates. The placement device 143 may be configured to assign locations for various circuit components within a chip's core area.

The routing device 144 may be configured to add wires to connect placed components in accordance with design rules for an integrated circuit. The redundant interconnection device 145 may be configured to provide at least one routing path connecting a signal bump on a die to at least one dummy micro bump on the same die distant from the signal bump within a predetermined Manhattan distance. In one embodiment, the predetermined Manhattan distance is set to not greater than 3 pitches. Furthermore, the pitch may be defined as the sum of a distance between two neighboring bumps' edges and the diameter of a bump. The static timing analyzer 146 may be configured to provide timing information on the circuit including at least one routing path. Each routing path may connect a signal bump to one of at least one dummy micro bump. The redundant interconnection removing device 147 may be configured to remove a routing path connecting a signal bump to a dummy micro bump that violates the timing information.

The apparatus 140 subsequently outputs a layout design after the redundant interconnection removal operation.

In some embodiments, the redundant interconnection device 145 is further configured to form routing paths for dummy micro bumps that are not distant from the signal bump within the predetermined Manhattan distance. For example, every two dummy micro bumps are connected by the redundant interconnection device 145 to form a micro bump set. Moreover, the apparatus 140 may comprise a processor (not shown) executing procedures prepared for performing the above embodied methods and a memory (not shown) storing data and programs required for executing the afore-mentioned procedures.

Although the current disclosure and its objectives have been described in detail, it should be understood that various changes, substitutions and alterations can be made herein without departing from the spirit and scope of the disclosure as defined by the appended claims. For example, many of the processes discussed above can be implemented using different methodologies, replaced by other processes, or a combination thereof.

Moreover, the scope of the current application is not intended to be limited to the particular embodiments of the process, machine, manufacture, composition of matter, means, methods and steps described in the specification. As one of ordinary skill in the art will readily appreciate from the disclosure of the current disclosure, processes, machines, manufacture, compositions of matter, means, methods, or steps, currently existing or later to be developed, that perform substantially the same function or achieve substantially the same result as the corresponding embodiments described herein may be utilized according to the current disclosure. Accordingly, the appended claims are intended to include within their scope such processes, machines, manufacture, compositions of matter, means, methods, or steps.

What is claimed is:

1. A computer-implemented method for timing analysis of integrated circuit design, comprising the steps of:
   generating a physical layout of an integrated circuit;
   performing interconnect redundancy, using a computer, on the physical layout of the integrated circuit to create a plurality of redundant interconnections, wherein the interconnect redundancy is based on a physical layout of an integrated circuit to be bonded;
   performing a first static timing analysis to compute an first expected timing of the integrated circuit;
   performing a first redundant interconnections removing to remove the redundant interconnections which have timing violations according to the first expected timing;
   setting Manhattan distance less than or equal to a predetermined value;
   placing a plurality of dummy micro bumps on at least one side of a die including a signal bump formed on the at least one side;
   determining an interconnecting candidate by selecting a dummy micro bump from the dummy micro bumps, which is spaced from the signal bump by the Manhattan distance;
   generating a routing path between the at least one interconnecting candidate and the signal bump; and
   outputting a chip layout through a computer.

2. The computer-implemented method of claim 1 further comprises stacking a plurality of chips.

3. The computer-implemented method of claim 2, wherein the plurality of chips layout includes a first chip layout having redundant interconnection on an lower side, a plurality of second chip layouts having redundant interconnections on an upper side and a lower side, and a third chip having redundant interconnections on an upper side.

4. The computer-implemented method of claim 3, wherein the plurality of second chip layouts are sandwiched between the first chip layout and the third chip layout.

5. The computer-implemented method of claim 2 further comprises performing a second static timing analysis to computing a second expected timing of the integrated circuit.

6. The computer-implemented method of claim 5 further comprises performing a second removing redundant interconnection to remove the redundant interconnections which have timing violation according to the second expected timing.

7. The computer-implemented method of claim 2 further comprises outputting a three dimension chip layout.

8. An apparatus for timing analysis of integrated circuit design, comprising:
a redundant interconnection device configured to provide a plurality of routing paths, each routing path connecting a signal bump on a semiconductor device to one of a plurality of dummy micro bumps on the semiconductor device, and the one of the plurality of dummy micro bumps being spaced from the signal bump within a predetermined Manhattan distance less than or equal to a predetermined value, wherein the routing path is determined by selecting a dummy micro bump from the dummy micro bumps, which is spaced from the signal bump by the Manhattan distance;
a static timing analyzer configured to provide timing information on a circuit on the semiconductor device; and
a redundant interconnection removing device configured to remove a routing path that violates the timing information.

9. The apparatus of claim 8, wherein the redundant interconnection device is further configured to form routing paths for dummy micro bumps that do not connect to the signal bump.

10. The apparatus of claim 8, wherein the predetermined Manhattan distance less than or equal to three pitches.

11. The apparatus of claim 8, wherein the semiconductor device comprises a plurality of dies stacked on each other.

* * * * *